US012596101B2

(12) United States Patent
Sjöstedt et al.

(10) Patent No.: US 12,596,101 B2
(45) Date of Patent: Apr. 7, 2026

(54) VIBRATING FORK TYPE FIELD DEVICE WITH COIL ARRANGEMENT TO INDUCE VIBRATION

(71) Applicant: Rosemount Tank Radar AB, Mölnlycke (SE)

(72) Inventors: Jon Sjöstedt, Gråbo (SE); Michael Larsson, Gothenburg (SE); Stig Larsson, Sävedalen (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 280 days.

(21) Appl. No.: 18/480,564

(22) Filed: Oct. 4, 2023

(65) Prior Publication Data

US 2024/0125739 A1 Apr. 18, 2024

(30) Foreign Application Priority Data

Oct. 18, 2022 (EP) ..................................... 22202050

(51) Int. Cl.
 *G01N 29/02* (2006.01)
 *G01F 23/22* (2006.01)
(52) U.S. Cl.
 CPC .......... *G01N 29/022* (2013.01); *G01F 23/22* (2013.01)
(58) Field of Classification Search
 CPC .......... G01N 29/022; G01N 2009/006; G01N 9/002; G01N 11/16; G01N 29/228; G01N 2291/014; G01N 2291/015; G01N 2291/02818; G01N 2291/02836; G01N 2291/0427; G01N 29/032; G01N 29/036; G01N 19/00; G01F 23/22; G01F 23/2967; B06B 1/045
 See application file for complete search history.

(56) References Cited

U.S. PATENT DOCUMENTS

2003/0072441 A1    4/2003  Kobayashi et al.
2005/0262944 A1*  12/2005  Bennett .............. G01N 29/4427
                                                              73/592
2018/0074018 A1    3/2018  Kuhnen et al.
2019/0372449 A1*  12/2019  Mills ........................ G21B 3/00
2022/0299350 A1*   9/2022  Schlosser ............ G01F 23/2968

FOREIGN PATENT DOCUMENTS

DE          4320411  C1    8/1994
DE    102015104536  A1    9/2016

OTHER PUBLICATIONS

Communication—Extended European Search Report from European Patent Application No. 22202050.5, dated Feb. 24, 2023.

* cited by examiner

*Primary Examiner* — Francis C Gray
(74) *Attorney, Agent, or Firm* — Westman, Champlin & Koehler, P.A.

(57) ABSTRACT

A field device comprising first and second tines; first and second rods coupled to the first and second tines; a coil arrangement fixed to the first rod; a magnet fixed to the second rod, opposite the coil arrangement; excitation circuitry coupled to the coil arrangement and controllable to provide a time-varying current to the coil arrangement, resulting in vibration of the first tine in relation to the second tine; sensing circuitry coupled to the coil arrangement and configured to provide a sensing signal indicative of a change in at least one property of the vibration of the first tine in relation to the second tine; and measurement control circuitry coupled to the excitation circuitry and the sensing circuitry for controlling operation of the excitation circuitry.

13 Claims, 7 Drawing Sheets

VIBRATING FORK TYPE FIELD DEVICE WITH COIL ARRANGEMENT TO INDUCE VIBRATION

CROSS-REFERENCE TO RELATED APPLICATION

This application claims priority to European Patent Application No. 22202050.5, filed Oct. 18, 2022, the content of which is hereby incorporated by reference in its entirety.

TECHNICAL FIELD OF THE INVENTION

The present invention relates to a vibrating fork type field device for determining a change in a property of a medium.

TECHNICAL BACKGROUND

Field devices relying on the use of changes in vibration properties of a vibrating fork to determine changes in material properties of the medium in which the vibrating fork is arranged, can be used to, for example, detect a predefined level in a tank, measure density and/or viscosity, or determine mixing ratios, etc. Such field devices are popular, due to their relative compactness, cost-efficiency, and low power consumption.

The vibrations in the tines of the vibrating fork can conveniently be induced using piezoelectric transducers. However, especially for high-temperature applications, it would be desirable to find an alternative, since currently available efficient and temperature insensitive piezoelectric transducers contain lead. One such alternative way of inducing the vibrations in the tines is to use time-varying electromagnetic forces.

US 2018/0074018 describes an electromechanical transducer unit for a field device comprising a membrane embodied to execute mechanical oscillations, two rods perpendicular to the membrane and secured to the membrane, and a housing. The membrane forms at least one portion of a wall of the housing, and the two rods extend into the housing interior. The electromagnetic transducer unit also comprises two magnets, wherein each magnet is secured in an end region away from the membrane to a different one of the two rods, and a coil with a core, wherein the coil is secured above the magnets within the housing, and is contactable with an electrical, alternating current signal, wherein the coil is embodied to produce a magnetic field that causes the two rods via the two magnets to execute mechanical oscillations, and wherein the two rods are secured to the membrane such that oscillations of the membrane result from oscillations of the two rods.

It would be desirable to provide an improved field device, in particular a field device that may be simpler and more cost-efficient.

SUMMARY

In view of the above, a general object of the present invention is to provide an improved vibrating fork type field device.

According an aspect of the present invention, it is therefore provided a field device for determining a change in a property of a medium, the field device comprising first and second tines to be arranged in the medium; first and second rods coupled to the first and second tines, in such a way that vibration of the first rod in relation to the second rod results in vibration of the first tine in relation to the second tine; a coil arrangement fixed to the first rod; a magnet fixed to the second rod, opposite the coil arrangement; excitation circuitry coupled to the coil arrangement and controllable to provide a time-varying current to the coil arrangement, resulting in vibration of the first tine in relation to the second tine; sensing circuitry coupled to the coil arrangement and configured to provide a sensing signal indicative of a change in at least one property of the vibration of the first tine in relation to the second tine; and measurement control circuitry coupled to the excitation circuitry and the sensing circuitry, and configured to: control the excitation circuitry to provide the time-varying current to the coil arrangement; receive the sensing signal from the sensing circuitry; and determine the change in the property of the medium based on the change in the at least one property of the vibration and a predetermined relation between the change in the at least one property of the vibration and the change in the property of the medium.

In existing vibrating fork type field devices with electromagnetically induced vibration, the coil used for inducing the vibration is wound around a specially shaped core that is fixed in a housing of the field device, and moving parts are provided with permanent magnets. The present invention is based on the realization that a simpler and more cost-efficient field device can be achieved by fixing a coil arrangement to one of the rods, and a magnet (permanent magnet or electromagnet) to the other one of the rods, and to induce the desired vibration by passing a time-varying current through a coil of the coil arrangement. Hence, the field device according to embodiments of the present invention may be operational with a magnetic system including only two magnetic members, in contrast to the three-member magnetic systems in the prior art field devices. This allows for simplified construction and manufacturing, and also provides for stronger coupling between the magnetic fields, so that lower power operation can be achieved.

In summary, the present invention thus relates to a field device comprising first and second tines; first and second rods coupled to the first and second tines; a coil arrangement fixed to the first rod; a magnet fixed to the second rod, opposite the coil arrangement; excitation circuitry coupled to the coil arrangement and controllable to provide a time-varying current to the coil arrangement, resulting in vibration of the first tine in relation to the second tine; sensing circuitry coupled to the coil arrangement and configured to provide a sensing signal indicative of a change in at least one property of the vibration of the first tine in relation to the second tine; and measurement control circuitry coupled to the excitation circuitry and the sensing circuitry for controlling operation of the excitation circuitry.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS OF THE INVENTION

Figure 1:
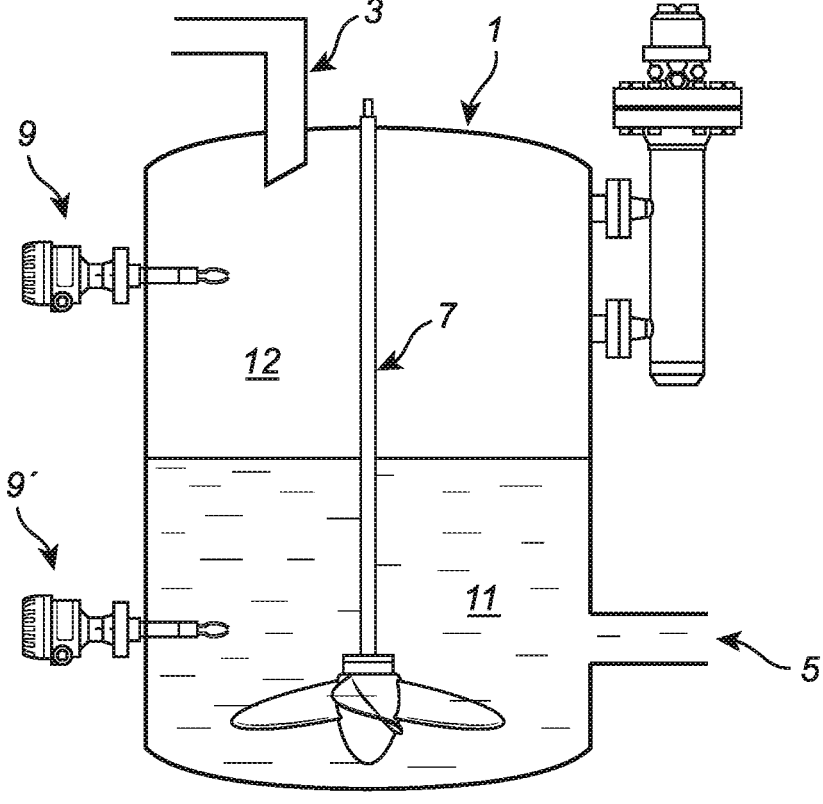
FIG. 1 schematically shows an example application for the field device according to embodiments of the present invention.

FIG. 1 schematically shows an example application for the field device according to embodiments of the present invention. Referring to FIG. 1, a process tank 1 has an inlet 3, an outlet 5, a agitator 7, and first 9 and second 9' field devices of the vibrating fork type. In the example arrangement in FIG. 1, the first 9 and second 9' field devices are arranged and configured to function as limit switches, where the first field device 9 indicates when the level of product 11 in the tank 1 goes up to and passing the level of the first field device 9 and the second field device 9' indicates when the level of the product 11 goes down to and passing the level of the second field device 9'. It should be understood that the tank 1 may be provided with at least one additional field device of the vibrating fork type, and that such (a) field device(s) may be configured to determine changes in one or more other properties of the product 11 in the tank 1. Examples of such properties may, for example, include the density, and/or the viscosity, and/or the composition of the product 11 (which may be a mixture of materials). Since methods for determining changes in such various properties based on changes in vibration properties of vibrating fork tines are, per se, well-known to one of ordinary skill in the relevant art, a detailed description of such methods is omitted.

Figures 2, 3:
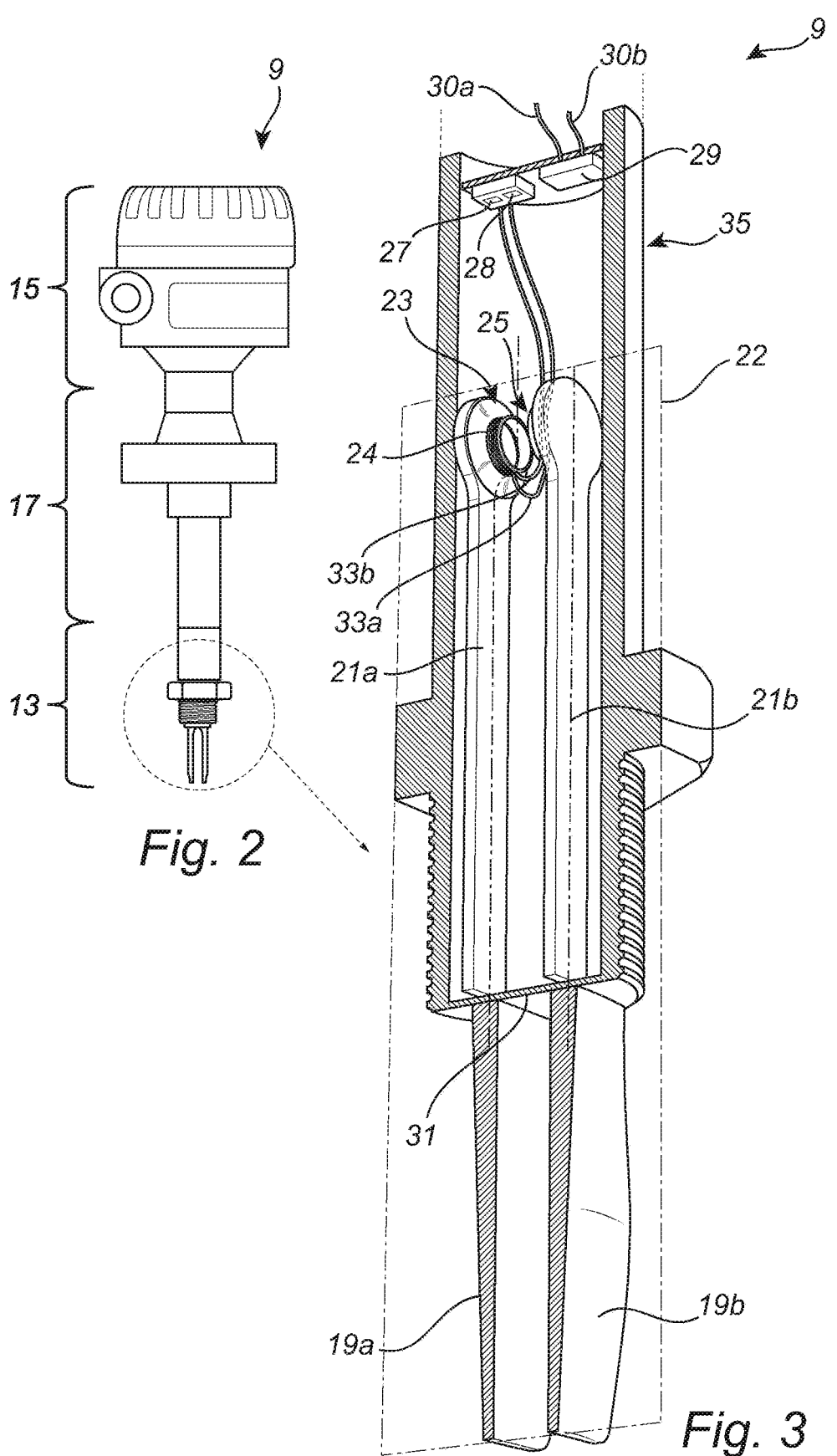
FIG. 2 is a schematic illustration of the field device according to example embodiments of the present invention.
FIG. 3 is a schematic partial cross-section view of a first embodiment of the field device in FIG. 2.

FIG. 2 is a scematic illustration of the field device 9 according to example embodiments of the present invention with a vibrating fork portion 13, an interface portion 15, and a neck portion 17 between the vibrating fork portion 13 and the interface portion 15.

FIG. 3 is an enlarged schematic view of the vibrating fork portion 13 of the field device 9 in FIG. 2. As can be seen in FIG. 3, the vibrating fork portion 13 is partially cut open by intersection with a plane 22 to reveal the interior of this portion of the field device 9. Referring to FIG. 3, the field device 9 comprises first and second tines 19*a-b*, first and second rods 21*a-b*, a coil arrangement 23, a magnet 25, excitation circuitry 27, sensing circuitry 28, and measurement control circuitry 29.

The first and second tines 19*a-b* are configured to be arranged in a medium, which may, for example, be the product 11 in the tank 1 in FIG. 1, or the atmosphere 12 above the product 11 in the tank 1 in FIG. 1. As is, per se, well known, vibration properties of the first and second tines 19*a-b* are influenced by material properties of the medium in which the first and second tines 19*a-b* are arranged. The first and second rods 21*a-b* are coupled to the first and second tines 19*a-b* in such a way that vibration of the first rod 21*a* in relation to the second rod 21*b* results in vibration of the first tine 19*a* in relation to the second tine 19*b*. Advantageously, the first and second rods 21*a-b* may be arranged and configured to be vibrated substantially in anti-phase with each other, and the first and second tines 19*a-b* may be coupled to the first and second rods 21*a-b* in such a way that vibration substantially in anti-phase of the first and second rods 21*a-b* results in vibration in anti-phase of the first and second tines 19*a-b*. An exemplary way of achieving such a vibration coupling between the rods 21*a-b* and the tines 19*a-b* is to couple the first and second rods 21*a-b* to the first and second tines 19*a-b* via a membrane 31.

As is schematically shown in FIG. 3, the coil arrangement 23, which is in this first embodiment provided in the form of a single coil 24, is fixed to the first rod 21*a*, and the magnet 25 is fixed to the second rod 21*b*, opposite the coil arrangement 23. The excitation circuitry 27 is coupled to the coil arrangement 23, via wires 33*a-b*. The excitation circuitry 27 is controllable to provide a time-varying current to a coil in the coil arrangement 23. The time-varying current results in a time-varying magnetic field around the coil arrangement 23, which in turn results in a time-varying force acting between the coil arrangement 23 and the magnet 25. This, in turn, results in vibration of the first rod 21*a* in relation to the second rod 21*b*. The wires 33*a-b* may be configured to allow relative motion of the coil arrangement 23 in relation to the excitation circuitry 27. To that end, the wires 33*a-b* may be provided with slack, as is schematically indicated in FIG. 3.

The sensing circuitry 28 (here indicated as being included in the same integrated circuit as the excitation circuitry 27) is also (directly or indirectly) coupled to the coil arrangement 23, and is configured to provide a sensing signal indicative of a change in at least one property of the vibration of the first rod 21*a* in relation to the second rod 21*b*, and thus indicative of a change in at least one property of the vibration of the first tine 19*a* in relation to the second tine 19*b*. In the example configuration in FIG. 3, the sensing circuitry 28 is indicated as being coupled to the coil arrangement via the wires 33*a-b* coupling the excitation circuitry 27 to the coil arrangement 23.

Finally, the measurement control circuitry 29 is coupled to the excitation circuitry 27 and the sensing circuitry 28, and configured to control the excitation circuitry 27 to provide the time-varying current to the coil arrangement 23, receive the sensing signal from the sensing circuitry 28, and determine a change in a property of the medium at least partly surrounding the tines 19*a-b* based on the change in the at least one property of the vibration, and a predetermined relation between the change in the at least one property of the vibration and the change in the property of the medium. To allow read-out of the change in the property of the medium, or of the property of the medium, from the field device 9, the measurement control circuitry 29 may be connected to interface circuitry (not shown) in the interface portion 15 of the field device, for example via wires 30*a-b*.

The first and second tines 19*a-b*, and the first and second rods 21*a-b* are arranged in such a way that, in an intersection of the field device 9 with a given plane 22, the first tine 19*a* is opposite and parallel with the second tinea 19*b* and the first rod 21*a* is opposite and parallel with the second rod 21*b*. As can be seen in FIG. 3, the coil arrangement 23 and the magnet 25 are also intersected by the plane 22. In FIG. 3, the indicated plane 22 is a symmetry plane for the first tine 19*a* and the second tine 19*b*, and also for the coil arrangement 23 that is fixed to the first rod 21*a* and for the magnet 25 that is fixed to the second rod 21*b*. This symmetric, in-line arrangement of the coil arrangement 23 and magnet 25 in relation to the first and second tines 19*a-b* reduces the risk of dynamic deformation of the tines 19*a-b* and/or rods 21*a-b* influencing the determination by the field device 9 of the change of the property of the medium 11. This may, in turn, provide for improved determination of the change of the property of the medium 11.

As is, per se, well known, properties of the vibration may include, for example, resonance frequency, damping, phase, etc. An increase in the density and/or viscosity of the medium at least partly surrounding the first and second tines 19*a-b* would typically result in a corresponding decrease of the resonance frequency and/or a corresponding decrease in vibration amplitude, etc.

Figure 4:
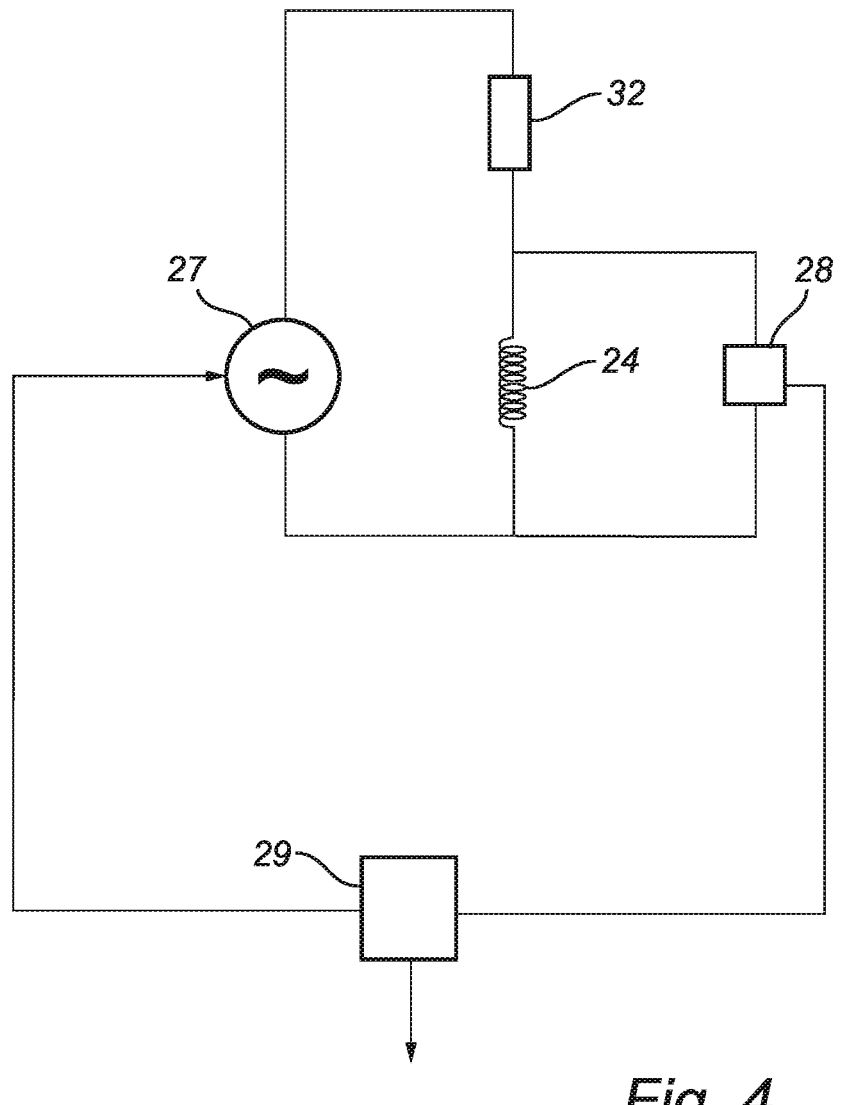
FIG. 4 is a circuit diagram schematically showing a read-out circuitry configuration for the first embodiment of the field device.

FIG. 4 is a circuit diagram schematically showing a read-out circuitry configuration for the first embodiment of the field device 9, described above with reference to FIG. 3.

Referring to FIG. 4, the excitation circuitry 27 is coupled to the above-mentioned single coil 24, and the sensing circuitry 28 is also coupled to the single coil 24. The excitation circuitry 27 is configured to provide a multi-frequency excitation signal to the single coil 24, and the sensing circuitry 28 is configured to sense a frequency-dependent impedance of the single coil 24. The excitation circuitry 27 and the sensing circuitry 28 are coupled to the measurement control circuitry 29. A change in the sensed frequency-dependent impedance may be an indication of the change of the property of the medium 11.

In the read-out circuitry configuration in FIG. 4, the excitation circuitry 27 is coupled to provide the multi-frequency excitation signal as a multi-frequency voltage across a series coupling arrangement of the single coil 24 and an auxiliary electric circuit element 32 having a known impedance, which may or may not be frequency-dependent, within a frequency range of the multi-frequency voltage; and the sensing circuitry 28 is coupled to sense the frequency-dependent impedance of the single coil 24 by sensing a voltage across the the single coil 24. The excitation circuitry 27, the single coil 24, the auxiliary electric circuit element 32, and the sensing circuitry 28 are coupled in a voltage divider configuration.

The multi-frequency excitation circuitry output voltage may be a pulse, a bandlimited noise signal or a frequency sweep.

In the case of a pulse, such as a step, which theoretically carries all frequencies, the response is sensed by the sensing circuitry 27, and may be evaluated using, per se known, peak signal detection. For example, an FFT and peak search may be used.

In the case of noise, a bandlimited noise signal with suitable frequency content for this application may be used, and the response is sensed by the sensing circuitry 27, and may be evaluated using, per se known, peak signal detection. For example, a z-transform and peak search may be used.

In the case of a frequency sweep, for example a sine sweep with a varying frequency may be used, and the response amplitude may be sensed by the sensing circuitry, and may be recorded together with the current frequency of the sweep.

The different output voltages mentioned above, and others, can be combined, and/or may be used adaptively. For instance, the measurement control circuitry 29 may control the excitation circuitry 27 to initially use a first excitation signal configuration, and then control the excitation circuitry 27 to use another excitation signal configuration, depending on an analysis of the sensing signal.

Referring again to FIG. 3, there may be free space/air between the first rod 21*a* and the second rod 21*b*, at least where the coil arrangement 23 and the magnet 25 are fixed. This allows for unperturbed action of the above-mentioned time-varying magnetic field, as well as unhindered motion of the first rod 21*a* in relation to the second rod 21*b*.

The field device 9 may comprise a housing 35, where the first and second rods 21*a-b*, the excitation circuitry 27, and the sensing circuitry 28 are enclosed by the housing 35, and the first and second tines 19*a-b* are arranged outside the housing. In embodiments with a membrane 31, the membrane 31 may be part of the housing 35.

It should be noted that anti-phase vibration and the use of a membrane is not essential for operation of the field device 9 according to embodiments of the present invention. For example, one of the tines, say 19*a*, and the corresponding rod 21*a* may be stationary, in relation to the housing 35.

Figure 5:
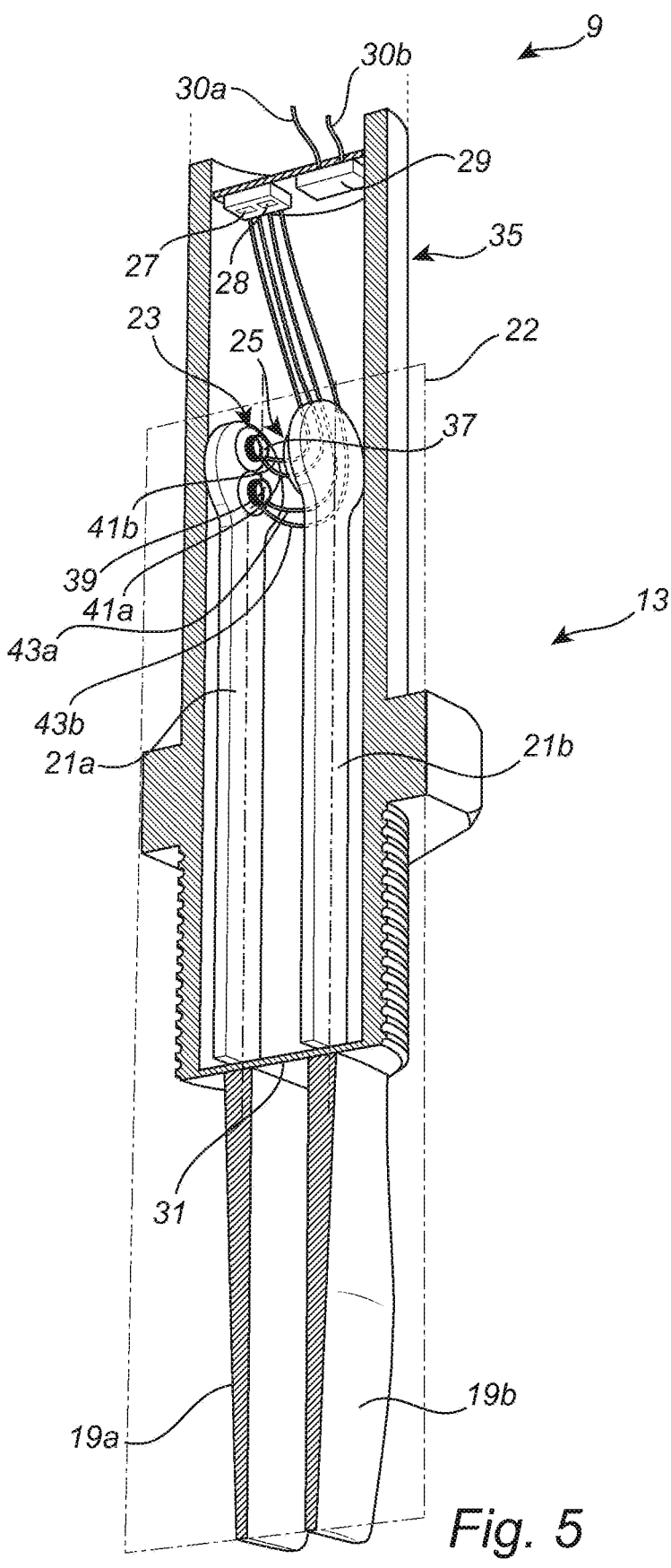
FIG. 5 is a schematic partial cross-section view of a second embodiment of the field device in FIG. 2.

FIG. 5 is a schematic partial cross-section view of a second embodiment of the field device 9 in FIG. 2. In this second embodiment, the coil arrangement 23 comprises a first coil 37 fixed to the first rod 21*a* and a second coil 39 fixed to the first rod 21*a*. The excitation circuitry 27 is coupled to the first coil 37 via first wires 41*a-b*, and the sensing circuitry 28 is coupled to the second coil 39 via second wires 43*a-b*. In this configuration, the first coil 37 is used to induce the vibration, and the second coil 39 is used to measure at least one property of the induced vibration. In the example configuration of FIG. 4, the first coil 37 and the second coil 39 are schematically indicated as being arranged next to each other. It should be noted that this is only an illustrative example configuration, and that the first 37 and second 39 coils may be arranged differently. As in the first embodiment in FIG. 3, the first and second tines 19*a-b*, and the first and second rods 21*a-b* are arranged in such a way that, in an intersection of the field device 9 with a given plane 22, the first tine 19*a* is opposite and parallel with the second tinea 19*b* and the first rod 21*a* is opposite and parallel with the second rod 21*b*. As can be seen in FIG. 5, the first coil 37 and the second coil 29 of the coil arrangement 23 and the magnet 25 are also intersected by the plane 22. In FIG. 5, the indicated plane 22 is a symmetry plane for the first tine 19*a* and the second tine 19*b*, and also for both the first coil 37 and the second coil 39 of the coil arrangement 23 that is fixed to the first rod 21*a* and for the magnet 25 that is fixed to the second rod 21*b*. This symmetric, in-line arrangement of the coil arrangement 23 and magnet 25 in relation to the first and second tines 19*a-b* reduces the risk of dynamic deformation of the tines 19*a-b* and/or rods 21*a-b* influencing the determination by the field device 9 of the change of the property of the medium 11. This may, in turn, provide for improved determination of the change of the property of the medium 11.

Figure 6:
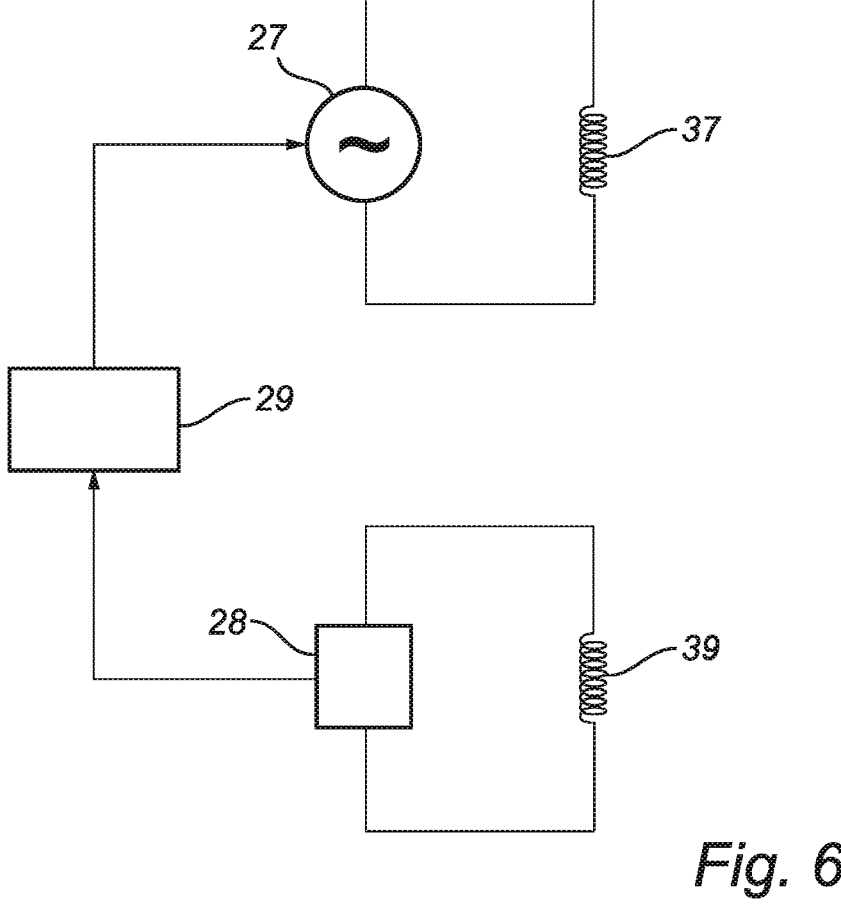
FIG. 6 is a circuit diagram schematically showing a read-out circuitry configuration for the second embodiment of the field device.

FIG. 6 is a circuit diagram schematically showing a read-out circuitry configuration for the second embodiment of the field device 9, described above with reference to FIG. 5.

Referring to FIG. 6, the excitation circuitry 27 is coupled to the above-mentioned first coil 37, and the sensing circuitry 28 is coupled to the above-mentioned second coil 39. The excitation circuitry 27 is configured to provide an excitation signal to the first coil 37, which will case the tines 19*a-b* to move in relation to each other, and the sensing circuitry 28 is configured to sense a response from the second coil 39.

Figure 7:
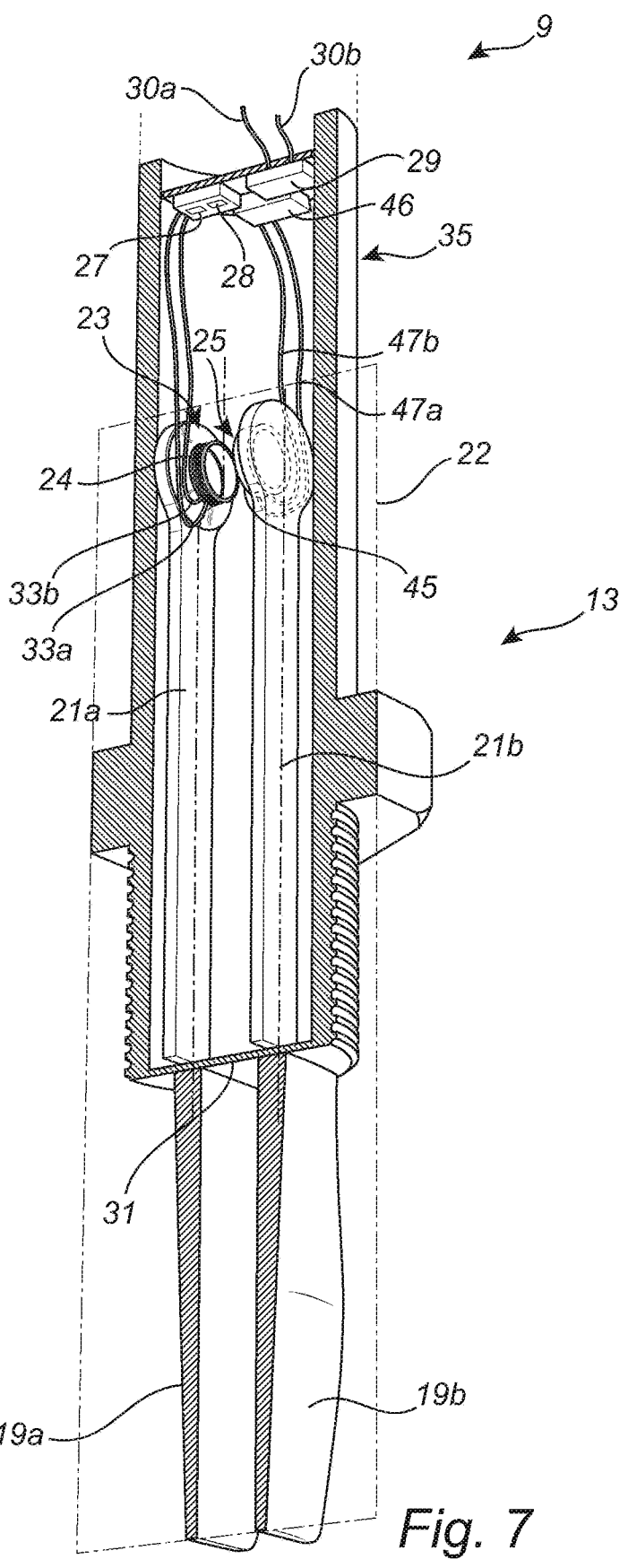
FIG. 7 is a schematic partial cross-section view of a third embodiment of the field device in FIG. 2.

FIG. 7 is a schematic partial cross-section view of a third embodiment of the field device 9 in FIG. 2. In this third embodiment, the magnet 25 is illustrated as comprising an electromagnet realized by a coil 45 that may be connected to a current source 46 via wires 47*a-b*. The use of an electromagnet may be advantageous in high temperature applications, since permanent magnets may be adversely affected by heat.

Figure 8:
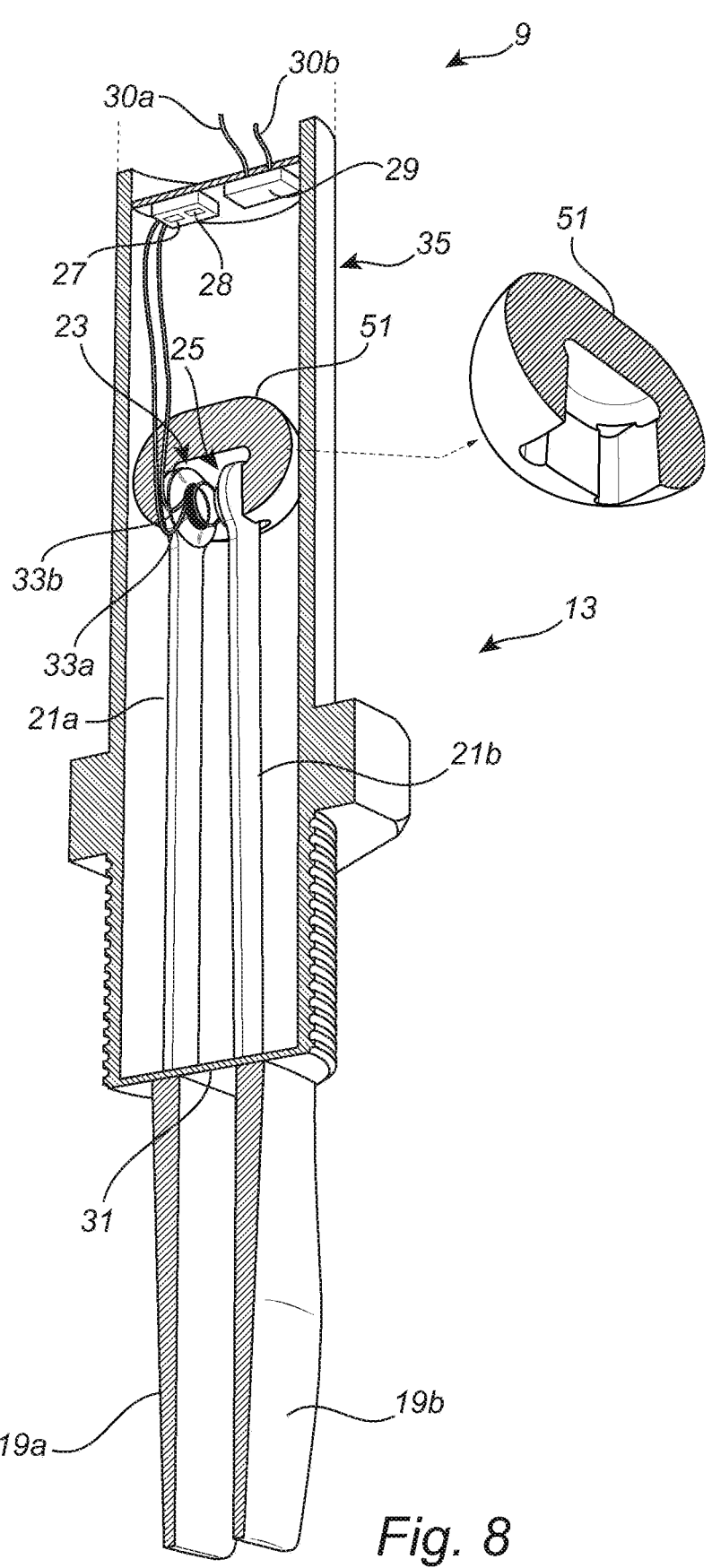
FIG. 8 is a schematic partial cross-section view of a fourth embodiment of the field device in FIG. 2.

FIG. 8 is a schematic partial cross-section view of a fourth embodiment of the field device 9 in FIG. 2. In this fourth embodiment, the field device 9 comprises a magnetic field guide member 51 surrounding the first and second rods 21*a*-*b*, at least where the coil arrangement 23 and the magnet 25 are fixed to their respective rods 21*a*-*b*. Through the provision of the magnetic field guide member 51, the magnetic flux efficiency can be increased, which in turn may provide for the use of a smaller permanent magnet and/or a coil (or coils) with fewer turns, and/or a lower coil current.

The person skilled in the art realizes that the present invention by no means is limited to the preferred embodiments described above. On the contrary, many modifications and variations are possible within the scope of the appended claims.

What is claimed is:

1. A field device for determining a change in a property of a medium, the field device comprising:

first and second tines to be arranged in the medium;

first and second rods coupled to the first and second tines, in such a way that vibration of the first rod in relation to the second rod results in vibration of the first tine in relation to the second tine;

a coil arrangement fixed to the first rod;

a magnet fixed to the second rod, opposite the coil arrangement;

excitation circuitry coupled to the coil arrangement and controllable to provide a time-varying current to the coil arrangement, resulting in vibration of the first tine in relation to the second tine;

sensing circuitry coupled to the coil arrangement and configured to provide a sensing signal indicative of a change in at least one property of the vibration of the first tine in relation to the second tine; and measurement control circuitry coupled to the excitation circuitry and the sensing circuitry, and configured to:

control the excitation circuitry to provide the time-varying current to the coil arrangement;

receive the sensing signal from the sensing circuitry; and determine the change in the property of the medium based on the change in the at least one property of the vibration and a predetermined relation between the change in the at least one property of the vibration, and the change in the property of the medium, wherein:

the field device comprises a housing;

the first and second rods, the excitation circuitry, and the sensing circuitry are enclosed by the housing; and the first and second tines are arranged outside the housing, wherein the excitation circuitry is fixed to the housing and coupled to the coil arrangement by wires.

2. The field device according to claim 1, wherein the first and second tines and the first and second rods are arranged in such a way that, in an intersection of the field device with a given plane, the first tine is opposite and parallel with the second tine and the first rod is opposite and parallel with second rod.

3. The field device according to claim 2, wherein the coil arrangement and the magnet are intersected by the given plane.

4. The field device according to claim 2, wherein the given plane is a symmetry plane for the first tine and for the second tine.

5. The field device according to claim 4, wherein the plane is a symmetry plane for the coil arrangement fixed to the first rod and for the magnet fixed to the second rod.

6. The field device according to claim 1, wherein the magnet fixed to the second rod is an electromagnet.

7. A field device for determining a change in a property of a medium, the field device comprising:

first and second tines to be arranged in the medium;

first and second rods coupled to the first and second tines, in such a way that vibration of the first rod in relation to the second rod results in vibration of the first tine in relation to the second tine;

a coil arrangement fixed to the first rod;

a magnet fixed to the second rod, opposite the coil arrangement;

excitation circuitry coupled to the coil arrangement and controllable to provide a time-varying current to the coil arrangement, resulting in vibration of the first tine in relation to the second tine;

sensing circuitry coupled to the coil arrangement and configured to provide a sensing signal indicative of a change in at least one property of the vibration of the first tine in relation to the second tine; and measurement control circuitry coupled to the excitation circuitry and the sensing circuitry, and configured to:

control the excitation circuitry to provide the time-varying current to the coil arrangement;

receive the sensing signal from the sensing circuitry; and determine the change in the property of the medium based on the change in the at least one property of the vibration and a predetermined relation between the change in the at least one property of the vibration, and the change in the property of the medium, wherein:

the field device comprises a housing;

the first and second rods, the excitation circuitry, and the sensing circuitry are enclosed by the housing; and the first and second tines are arranged outside the housing, wherein:

the housing comprises a membrane; and the first and second rods are coupled to the first and second tines via the membrane.

8. A field device for determining a change in a property of a medium, the field device comprising:

first and second tines to be arranged in the medium;

first and second rods coupled to the first and second tines, in such a way that vibration of the first rod in relation to the second rod results in vibration of the first tine in relation to the second tine;

a coil arrangement fixed to the first rod;

a magnet fixed to the second rod, opposite the coil arrangement;

excitation circuitry coupled to the coil arrangement and controllable to provide a time-varying current to the coil arrangement, resulting in vibration of the first tine in relation to the second tine;

sensing circuitry coupled to the coil arrangement and configured to provide a sensing signal indicative of a change in at least one property of the vibration of the first tine in relation to the second tine; and measurement control circuitry coupled to the excitation circuitry and the sensing circuitry, and configured to:

control the excitation circuitry to provide the time-varying current to the coil arrangement;

receive the sensing signal from the sensing circuitry; and determine the change in the property of the medium based on the change in the at least one property of the vibration and a predetermined relation between the change in the at least one property of the vibration, and the change in the property of the medium, wherein:

the coil arrangement comprises a first coil fixed to the first rod and a second coil fixed to the first rod;

the excitation circuitry is coupled to the first coil; and the sensing circuitry is coupled to the second coil.

9. The field device according to claim 8, wherein the first coil and the second coil are fixed to the first rod at different distances from the first tine.

10. A field device for determining a change in a property of a medium, the field device comprising:

first and second tines to be arranged in the medium;

first and second rods coupled to the first and second tines, in such a way that vibration of the first rod in relation to the second rod results in vibration of the first tine in relation to the second tine;

a coil arrangement fixed to the first rod;

a magnet fixed to the second rod, opposite the coil arrangement;

excitation circuitry coupled to the coil arrangement and controllable to provide a time-varying current to the coil arrangement, resulting in vibration of the first tine in relation to the second tine;

sensing circuitry coupled to the coil arrangement and configured to provide a sensing signal indicative of a change in at least one property of the vibration of the first tine in relation to the second tine; and measurement control circuitry coupled to the excitation circuitry and the sensing circuitry, and configured to:

control the excitation circuitry to provide the time-varying current to the coil arrangement;

receive the sensing signal from the sensing circuitry; and determine the change in the property of the medium based on the change in the at least one property of the vibration and a predetermined relation between the change in the at least one property of the vibration, and the change in the property of the medium, wherein:

the coil arrangement comprises a single coil fixed to the first rod;

the excitation circuitry is coupled to the single coil and configured to provide a multi-frequency excitation signal to the single coil; and the sensing circuitry is coupled to the single coil and configured to sense a frequency-dependent impedance of the single coil.

11. The field device according to claim 10, wherein:

the excitation circuitry is coupled to provide the multi-frequency excitation signal as a multi-frequency voltage across a series coupling arrangement of the single coil and an auxiliary electric circuit element having a known impedance within a frequency range of the multi-frequency voltage; and the sensing circuitry is coupled to sense the frequency-dependent impedance of the coil by sensing a voltage across the the single coil.

12. The field device according to claim 11, wherein the excitation circuitry, the single coil, the auxiliary electric circuit element, and the sensing circuitry are coupled in a voltage divider configuration.

13. The field device according to claim 10, wherein the multi-frequency excitation circuitry output voltage is a pulse, and/or a bandlimited noise signal, and/or a frequency sweep.

* * * * *